UNITED STATES PATENT OFFICE.

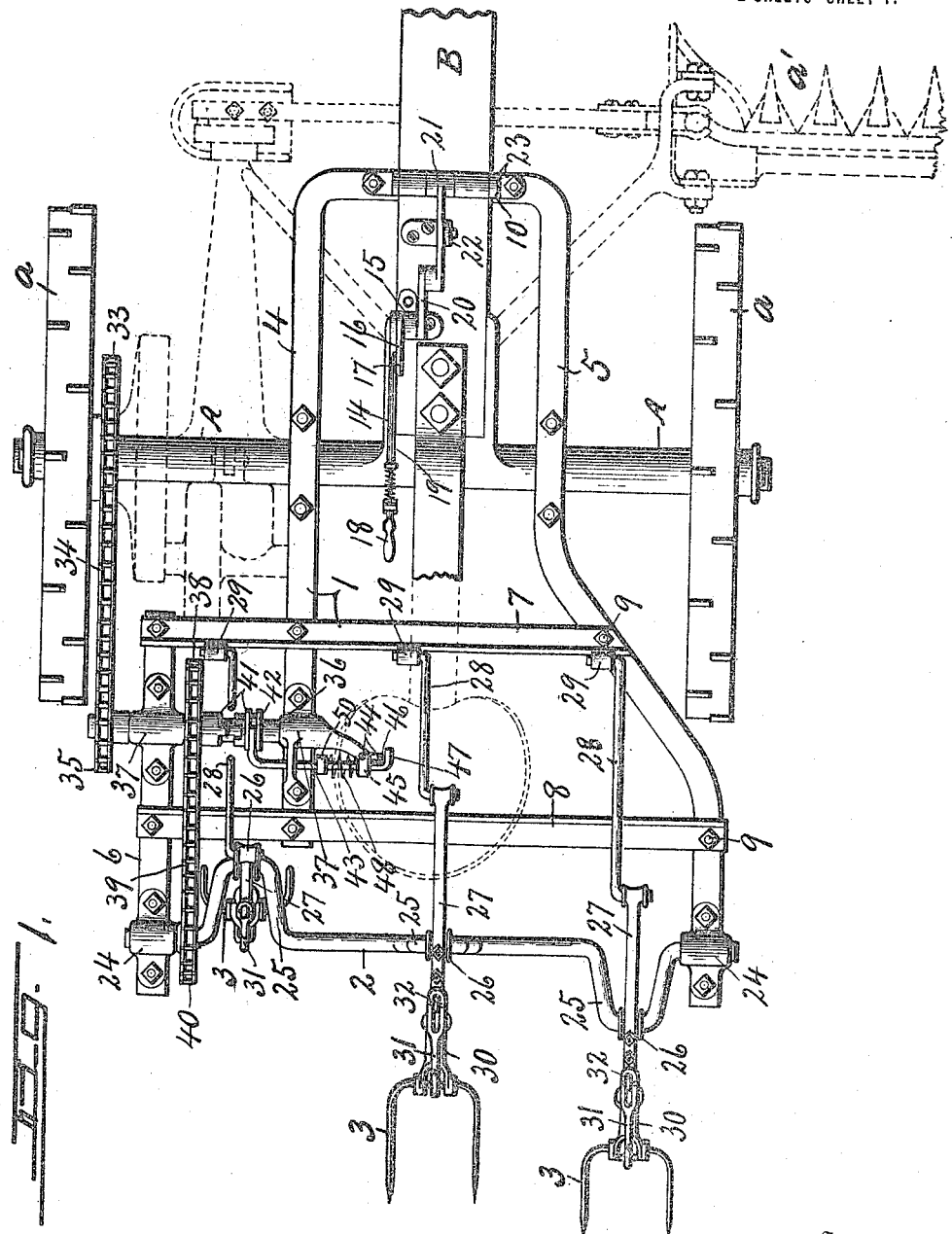

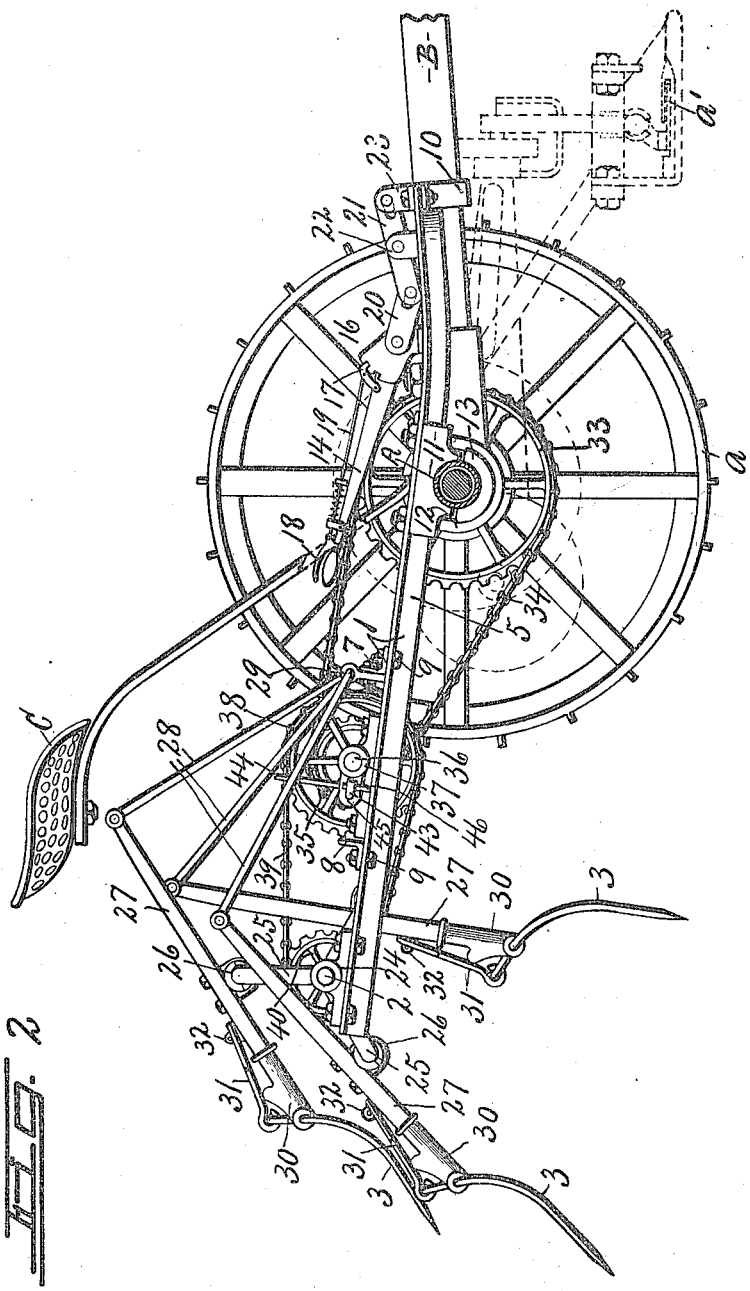

WILLIAM H. MacDONALD, OF ELMWOOD, NEW YORK.

HAY-TEDDER FOR MOWING-MACHINES.

1,194,528. Specification of Letters Patent. Patented Aug. 15, 1916.

Application filed November 4, 1911. Serial No. 658,509.

*To all whom it may concern:*

Be it known that I, WILLIAM H. MAC-DONALD, of Elmwood, in the county of Onondaga, in the State of New York, have invented new and useful Improvements in Hay-Tedders for Mowing-Machines, of which the following, taken in connection with the accompanying drawings, is a full, clear, and exact description.

This invention relates to certain improvements in a combined mower and hay tedder involving the use of a tedder supporting frame which is fulcrumed upon the fixed section of the mower axle but wholly independent of the lower frame so that it may be attached to any of the mowing machines now in common use.

The main object therefore is to provide a simple, efficient and comparatively inexpensive tedder attachment which may be easily and quickly applied to ordinary mowing machines and which is capable of adjustment without in any way effecting the harmonious coaction of the mower and tedder.

Another object is to extend the front end of the tedder frame forwardly along the pole of the mower so as to utilize the underside of the pole as a limiting stop for limiting the downward movement of the tedder forks on the rear end of the frame to the most effective position for loosening or spreading the hay.

A further object is to provide means for rocking the tedder frame upon the fixed section of the axle to raise and lower the forks as may be desired.

A still further object is to provide means whereby the tedder shaft may be thrown into and out of operative connection with its driving mechanism.

Other objects and uses will be brought out in the following description.

In the drawings, Figure 1 is a top plan and Fig. 2 a side elevation of a combined mower and tedder embodying the various features of my invention, portions of the mowing machine being shown in dotted lines.

In order that my invention may be clearly understood I have shown a portion of a mowing machine comprising a fixed axle section —A— and opposite traction wheels —a— together with the usual mechanism for transmitting motion from one of the wheels to a reciprocatory cutter bar —a'— shown by dotted lines in Figs. 1 and 2.

The hay tedder comprises a main supporting frame —1—, a crank shaft —2— and a plurality of tedder forks —3— together with suitable mechanism for transmitting rotary motion from one of the wheels —a— to the crank shaft —2—.

The frame —1— is composed of lengthwise side bars —4—, —5— and —6— and cross bars —7— and —8— all of which are preferably made of stock angle irons, the lengthwise bars —4—, —5— and —6— being arranged with their horizontal flanges uppermost to form a more convenient seat and connection for the cross bars —7— and —8— which are arranged with their horizontal flanges at the lower side and are secured to the lengthwise bars at their intersections therewith by suitable fastening means as bolts —9—.

The lengthwise bars —4— and —5— fulcrumed intermediate their ends upon and extend forwardly and rearwardly some distance beyond the axle section —A— some distance apart and at opposite sides of a pole —B— by which the machine is drawn along the ground, the front ends of the bars being bent toward the pole and are rigidly connected across the underside thereof by means of a tie piece or yoke —10— as best seen in Fig. 2 so as to form with the underside of the pole a limiting stop for limiting the downward rocking movement of the rear end of the tedder frame.

As previously intimated the tedder frame is adapted to rock upon the axle section —A— and for this purpose I have provided the adjacent portions of the bars —4— and —5— with seat blocks —11— resting upon the upper surface of the axle section —A— and secured to the frame bars —4— and —5— by means of clip bolts —12— which extend under the axle section —A— and engage semi-circular bearing pieces —13—, the latter being held against the underside of the axle section —A— by means of the clip bolts, thus allowing the tedder frame to rock upon said axle section. Otherwise this tedder frame is entirely free from connection with the frame of the mowing machine.

The tedder shaft —2— and fork —3— are mounted upon the frame some distance to the rear of the axle section —A— and are adapted to be raised and lowered to and from the ground by the rocking of the frame through the medium of any suitable mechanism and for this purpose I have provided a hand lever —14— which, in this instance, is pivotally mounted upon a suitable bracket —15— on the rear end of the pole —B— in front of the axle section —A— and is movable about a concentric toothed rack —16— which is rigid on said bracket and adapted to be engaged by a pawl —17— on the lever, the pawl being movable into and out of engagement with the teeth of the rack by means of a hand lever —18— and a link —19— connecting the lever —18— with the pawl.

Secured to the pivotal end of the lever —16— is a crank arm —20— operatively connected with a link —21— which is pivoted to a suitable bracket —22— on the pole and is connected at its front end to a bracket —23— on the front end of the frame —1— so that by operating the lever —14— vertically the front end of the tedder frame will be correspondingly lowered to vary the position of the forks —3— relatively to the surface of the ground as may be desired, the yoke —10— serving to prevent excessive downward movement of the forks.

This hay tedder is adapted more particularly for side cut mowing machines so that the traction power such as horses will travel at one side of instead of through the standing hay or grain, and one of the objects of my invention is to position the entire series of tedder forks at the inner side of the inner end of the cutter bar —a'— of the mowing machine so as to operate only upon the previously cut swath and not upon the last cut swath. In other words the inner end of the cutter bar terminates approximately in line with one of the wheels as the right hand wheel and is located at the front thereof, while the right hand fork —3— of the series is located nearly in line but just at the inside of the line of travel of the same wheel so that the entire series of forks is located at the left of such wheel and at the rear thereof, thereby spreading the previously cut swath of hay as hereinbefore mentioned.

In order that the frame may be as light as possible and still be sufficiently durable to withstand the strains to which it may be subjected and to bring the entire series of forks within the outermost side bars, the rear end of the right hand side bar —5— is deflected to the right at the rear of the corresponding wheel —a— as best seen in Fig. 1 to support the adjacent end of the crank shaft —2—, the opposite end of the said crank shaft being supported upon the rear end of the opposite lengthwise bar —6—. The opposite ends of the shaft —2— are therefore journaled in suitable bearings —24— on the rear ends of the bars —5— and —6— some distance to the rear of the rear cross bar —8— and is provided with a series of, in this instance three, U-shaped crank arms —25— upon which are journaled bearings —26— for receiving and supporting the corresponding fork arms as —27—. These fork arms are therefore journaled intermediate their ends upon the crank arms —25— of the crank shaft —2— for vertical or forward and rearward rocking movement, the upper ends of said arms being pivotally connected to the rear ends of suitable links —28— having their front ends journaled in suitable bearings —29— on the cross bar —7—.

The forks —3— are rigidly mounted in suitable heads —30— on the lower ends of the arms —27— and are additionally held in place by links —31— which are attached to lugs —32— on said arms just above the heads —30— as best seen in Fig. 2.

The mechanism for transmitting rotary motion from one of the wheels to the crank shaft —2— preferably consists of a sprocket wheel —33— secured to and concentric with the left hand traction wheel —a— and connected by a sprocket chain —34— to a somewhat smaller sprocket wheel —35— on a counter shaft —36— which is journaled in suitable bearings —37— on the lengthwise frame bars —4— and —6— between and parallel with the cross bars —7— and —8— as best seen in Fig. 1. Secured to this counter shaft is a sprocket wheel —38— which is connected by a chain —39— to a somewhat smaller sprocket wheel —40— on the corresponding end of the crank shaft —2—, the sprocket wheels —38— and —40— and chain —39— being located in close proximity to the inner side of the frame bar —6—. Included in this power transmitting mechanism is a clutch —41— having a movable section —42— feathered upon the counter shaft —36— and adapted to be moved into and out of engagement with the coacting clutch section by means of a sliding shift bar —43— and operating member —44—. This operating member —44— is within easy reaching distance of the seat as —C— of the machine and is adapted to be operated at will and for this purpose its lower end is journaled in one of the bearings —45— for the sliding shift bar —43— and is provided with a laterally projecting cam —46— for engaging a shoulder —47— on said shift bar to move the latter against the action of a retracting spring —48—.

The opposite end of the shift bar is provided with a lateral offset adapted to ride in an annular groove in the clutch section —42— as best seen in Fig. 1 so that as the shift bar is moved back and forth it will impart a corresponding motion to the movable clutch section for throwing the latter into and out of operative engagement with the coacting clutch member.

The spring —48— is interposed between the bearing —45— and a suitable shoulder —50— on the shift bar —43— and is tensioned to force the shift bar in one direction to bring the clutch sections into engagement with each other for locking the sprocket wheel —38— to the shaft —36—, said clutch sections being locked in their open position against the action of the spring by simply turning the cam —44— to the position shown in Fig. 1.

The cross bars —7— and —8— of the main supporting frame are spaced some distance apart to the rear of the axle section —A— and by securing them to the lengthwise bars —4— and —5— in the manner described and making the lengthwise bar —6— of just sufficient length to be secured to the adjacent ends of the cross bars —7— and —8— and also to receive the adjacent end of the shaft —2—, I am enabled to produce a comparatively inexpensive yet light, strong and durable hay tedder attachment capable of being applied to any of the side cut mowing machines now in common use.

What I claim is:

The combination with a mowing machine having a frame, supporting wheels therefor and a pole attached to the frame, of a separate tedder frame journaled intermediate its ends on the mower frame co-axial with the axis of the wheels and wholly between said wheels in a horizontal plane close to said axis, the front end of the tedder frame being of considerably less width than the rear end and provided with a cross bar extending across the pole, connections between said pole and cross bar for rocking the tedder frame about its axis, a crank shaft journaled on the rear end of the tedder frame parallel with the axis of the wheels, a cross bar secured to the tedder frame between the crank shaft and axis of movement of said tedder frame, tedder forks journaled on the crank shaft, flexing connections between the front ends of the tedder forks and last-named cross bar, a counter shaft on the tedder frame between the crank shaft and last-named cross bar, driving connections between one of the wheels of the mower and counter shaft, and additional driving connections between the counter shaft and crank shaft including a clutch.

In witness whereof I have hereunto set my hand on this 11th day of September 1911.

WILLIAM H. MacDONALD.

Witnesses:
H. E. CHASE,
E. F. SPEARING.

Copies of this patent may be obtained for five cents each, by addressing the "Commissioner of Patents, Washington, D. C."